US010003069B2

(12) United States Patent
Yamauchi et al.

(10) Patent No.: US 10,003,069 B2
(45) Date of Patent: Jun. 19, 2018

(54) LEAD-ACID BATTERY

(71) Applicant: GS Yuasa International Ltd., Kyoto-shi, Kyoto (JP)

(72) Inventors: Kenji Yamauchi, Kyoto (JP); Masaaki Kyo, Kyoto (JP); Satoshi Inagaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 339 days.

(21) Appl. No.: 15/044,286

(22) Filed: Feb. 16, 2016

(65) Prior Publication Data

US 2016/0240852 A1 Aug. 18, 2016

(30) Foreign Application Priority Data

Feb. 18, 2015 (JP) .................................. 2015-029556
Dec. 21, 2015 (JP) .................................. 2015-248242

(51) Int. Cl.
*H01M 10/06* (2006.01)
*H01M 4/14* (2006.01)
*H01M 2/16* (2006.01)
*H01M 10/08* (2006.01)

(52) U.S. Cl.
CPC ............. *H01M 4/14* (2013.01); *H01M 10/06* (2013.01); *H01M 2/1646* (2013.01); *H01M 10/08* (2013.01); *H01M 2220/20* (2013.01)

(58) Field of Classification Search
CPC .... H01M 4/14; H01M 10/06; H01M 2220/20; H01M 2/1646; H01M 10/08
See application file for complete search history.

(56) References Cited

U.S. PATENT DOCUMENTS

| 5,348,817 A | 9/1994 | Cherng | |
|---|---|---|---|
| 2008/0107960 A1 | 5/2008 | Furukawa | |
| 2008/0305396 A1 | 12/2008 | Boden | |
| 2009/0325068 A1* | 12/2009 | Boden ..................... | H01M 4/14 429/215 |
| 2012/0237829 A1* | 9/2012 | Fujiwara ................. | H01M 4/14 429/227 |
| 2013/0099749 A1* | 4/2013 | Shibahara ................. | H02J 7/00 320/128 |
| 2016/0240857 A1* | 8/2016 | Inagaki ................. | H01M 4/625 |

FOREIGN PATENT DOCUMENTS

| JP | 06294718 | 10/1994 |
|---|---|---|
| JP | 6349519 A2 | 12/1994 |
| JP | 2001155723 A2 | 6/2001 |
| JP | 2002231247 A2 | 8/2002 |
| JP | 2012079432 A2 | 4/2012 |

(Continued)

OTHER PUBLICATIONS

Extended European Search Report dated May 30, 2016 issued in the corresponding European patent application No. 16154394.7.

*Primary Examiner* — Stewart A Fraser
(74) *Attorney, Agent, or Firm* — Rankin, Hill & Clark LLP

(57) ABSTRACT

A lead-acid battery includes a negative electrode material containing graphite and barium sulfate. A ratio S/W of an average plate interval S between a negative electrode plate and a positive electrode plate, to a mass W of the negative electrode material per one negative electrode plate is 0.01 mm/g or more.

16 Claims, 5 Drawing Sheets

(56) References Cited

FOREIGN PATENT DOCUMENTS

| | | |
|---|---|---|
| JP | 2012089310 A2 | 5/2012 |
| JP | 2012181965 A2 | 9/2012 |
| JP | 5584216 B2 | 9/2014 |
| JP | 2015008156 A2 | 1/2015 |
| WO | 200736979 | 4/2009 |
| WO | 201152438 | 5/2011 |
| WO | 201190113 | 7/2011 |
| WO | 201346499 | 4/2013 |
| WO | 2011142072 A1 | 7/2013 |
| WO | 2013128941 A1 | 9/2013 |

* cited by examiner

LEAD-ACID BATTERY

CROSS-REFERENCE TO RELATED APPLICATIONS

This application claims the benefit of Japanese patent applications No. 2015-029556, filed on Feb. 18, 2015, and No. 2015-248242, filed on Dec. 21, 2015, which are incorporated by reference.

FIELD

The present invention relates to a lead-acid battery, and particularly relates to a lead-acid battery which is used in an environment involving deep discharge.

BACKGROUND

With the advent of idling-stop vehicles, lead-acid batteries have been deeply discharged more often than before. For example, lead-acid batteries of idling-stop vehicles are based on the premise that they are used in a partial state of charge (PSOC). Lead-acid batteries for cycle applications like those for forklift trucks have been used at a deep depth of discharge (DOD). When a lead-acid battery is used in a partial state of charge, its life is reduced due to accumulation of lead sulfate in a positive electrode or sulfation of a negative electrode. In the partial state of charge, agitation of an electrolyte solution by gas evolution is insufficient, and thus the electrolyte solution is easily stratified. This further reduces the life of a lead-acid battery.

Meanwhile, when the lead-acid battery transitions into an overdischarged state from the partial state of charge because, for example, the vehicle is left unattended for a long period of time, metal lead passes through the separator, and thus a permeation short circuit, in which both positive and negative electrode plates are short-circuited, easily occurs. The concentration of sulfate ions in the electrolyte solution decreases due to overdischarge, and correspondingly, the concentration of lead ions in the electrolyte solution increases. The lead ions are reduced on the negative electrode plate during charge, and metal lead dendrite grows through pores inside the separator, and thus passes through the separator to short-circuit the positive electrode plate and the negative electrode plate.

The applicant proposed improvement of the life of a lead-acid battery in the PSOC by including graphite in a negative electrode material. For example, Patent Document 1 (WO 2011/90113) discloses that a negative electrode material is made to contain 0.02 to 2.20 mass % of graphite, 0.5 mass % of barium sulfate, and 0.02 to 2.20 mass % of carbon black. Patent Document 2 (WO 2011/52438) discloses that a negative electrode material is made to contain 0.5 to 3.0 mass % of expanded graphite and 0.6 mass % of barium sulfate. Among documents other than those by the applicant, for example, Patent Document 3 (JP5584216 B) discloses that a negative electrode material is made to contain 1 to 3 mass % of graphite, 0.8 mass % of barium sulfate, and 0.1 to 2 mass % of carbon black.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Graphite particles form a path for electrons to lead sulfate, and thus facilitate charge at a negative electrode. The inventors have found, in the process of conducting studies on improvement of the PSOC life, that graphite in a negative electrode material causes a permeation short circuit. This can be because when a graphite particle is exposed to, or protrudes from, a surface of a negative electrode plate, the exposed portion or the like of the graphite particle serves as a center of precipitation of metal lead. As a result, metal lead dendrite may grow from an exposed graphite particle, and pass through the separator to cause a short circuit. The fact that graphite in the negative electrode material causes a permeation short circuit was not known, and was first found by the present inventors.

An object of the present invention is to provide a lead-acid battery that is:
  unlikely to be subjected to a permeation short circuit caused by graphite or carbon fiber, and
  excellent in life performance in an environment involving deep discharge, such as a PSOC.

Means for Solving the Problems

An aspect of the present invention provides a lead-acid battery including a negative electrode plate, a positive electrode plate, an electrolyte solution, and a separator, wherein the negative electrode plate includes a negative electrode material containing either graphite or carbon fiber, and barium sulfate, and an average plate interval S between the negative electrode plate and the positive electrode plate, and a mass W of the negative electrode material per one negative electrode plate are in a ratio S/W of 0.01 mm/g or more.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
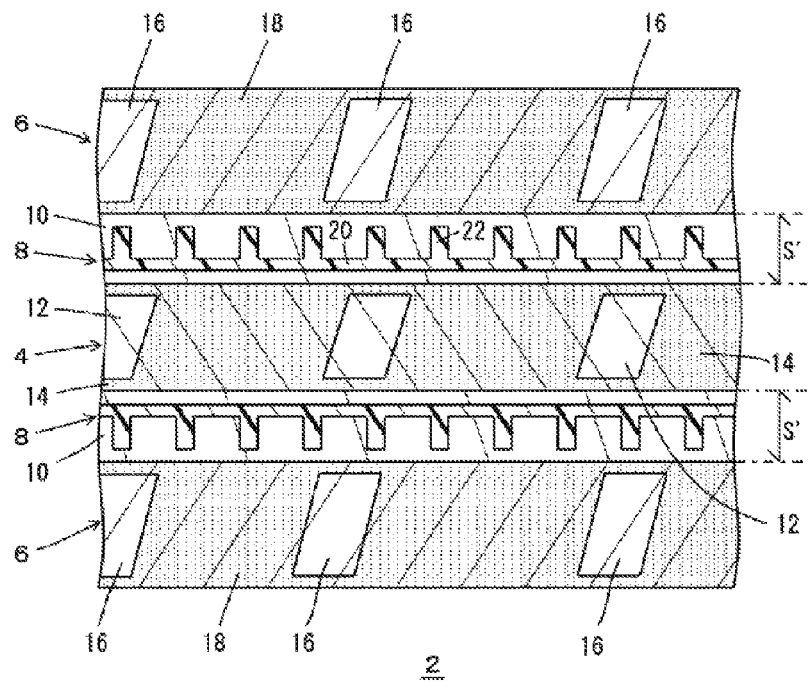
FIG. 1 is a sectional view of a part of a lead-acid battery in an example.

An aspect of the present invention provides a lead-acid battery including a negative electrode plate, a positive electrode plate, an electrolyte solution, and a separator, wherein the negative electrode plate includes a negative electrode material containing either graphite or carbon fiber, and barium sulfate, and an average plate interval S between the negative electrode plate and the positive electrode plate, and a mass W of the negative electrode material per one negative electrode plate are in a ratio S/W of 0.01 mm/g or more.

The graphite may not only be scalelike graphite or expanded graphite of Example, but may also be natural graphite such as scaly graphite or earthy graphite, or artificial graphite, or expansion graphite, etc. Scalelike graphite and expanded graphite are preferable, with scalelike graphite being particularly preferable. Expanded graphite is graphite that has been expanded. Carbon fiber has an effect similar to that of graphite. Carbon fiber to be used has, for example, a length in a range of 5 μm or more and 500 μm or less.

Graphite or carbon fiber (hereinafter referred to as "graphite or the like") provides a path for electrons to lead sulfate in the negative electrode material, and facilitates reduction of the lead sulfate. This improves life performance in a non-fully charged condition of a lead-acid battery, such as a PSOC life of a lead-acid battery. On the other hand, it has been found that inclusion of graphite or the like in the negative electrode material causes a permeation short circuit to easily occur. It was not known that inclusion of graphite or the like in the negative electrode material of a lead-acid battery causes a permeation short circuit to easily occur.

Thus, the present inventors conducted studies on inhibition of occurrence of a permeation short circuit while graphite or the like is contained in the negative electrode material to improve the PSOC life. As a result, it has been found that even when the negative electrode material contains graphite or the like, a lead-acid battery having excellent PSOC life performance and excellent permeation short circuit resistance performance is obtainable when the negative electrode material contains barium sulfate, and a ratio S/W (hereinafter referred to as "inter-electrode ratio") is 0.01 mm/g or more where S is an average plate interval between the negative electrode plate and the positive electrode plate, and W is a mass of the negative electrode material per one negative electrode plate.

Note that elemental barium or a barium compound such as barium carbonate may be used instead of barium sulfate. This is because elemental barium or a barium compound added to the negative electrode material changes to barium sulfate after the addition.

A content of graphite or the like in the negative electrode material of 0.5 mass % or more significantly improves the PSOC life, and is thus preferred. Moreover, a content of graphite or the like in the negative electrode material of 1.5 mass % or more especially significantly improves the PSOC life, and is thus more preferred.

A content of graphite or the like in the negative electrode material of less than 2.5 mass % can inhibit a permeation short circuit, and is thus preferred. Moreover, a content of graphite or the like in the negative electrode material of 2.0 mass % or less can further inhibit a permeation short circuit, and is thus more preferred.

A content of barium sulfate in the negative electrode material of 0.6 mass % (equivalent to 0.35 mass % of elemental barium) or more has a large effect of inhibiting a permeation short circuit, and is thus preferred. A content of barium sulfate in the negative electrode material of 1.2 mass % (equivalent to 0.7 mass % of elemental barium) or more has an especially large effect of inhibiting a permeation short circuit, and is thus more preferred.

A content of barium sulfate in the negative electrode material of 3.5 mass % or less improves the PSOC life, and therefore, the content of barium sulfate in the negative electrode material is preferably 3.5 mass % (equivalent to 2.05 mass % of elemental barium) or less. A content of barium sulfate in the negative electrode material of 3.0 mass % or less significantly improves the PSOC life, and therefore, the content of barium sulfate in the negative electrode material is more preferably 3.0 mass % (equivalent to 1.75 mass % of elemental barium) or less.

An inter-electrode ratio S/W of 0.02 mm/g or less improves the PSOC life, and thus the inter-electrode ratio S/W is preferably 0.02 mm/g or less. An inter-electrode ratio S/W of 0.016 mm/g or less significantly improves the PSOC life, and is thus more preferred.

Even when the negative electrode material contains graphite or carbon fiber, and barium sulfate, and the inter-electrode ratio S/W is 0.01 mm/g or more, a permeation short circuit may not be completely inhibited. Thus, the present inventors have conducted studies on further inhibiting a permeation short circuit.

An electric resistivity (hereinafter referred to simply as "resistivity") of graphite or the like in the negative electrode material of 0.01 Ω·cm or less in powder form as measured by a four-terminal method further inhibits a permeation short circuit. Thus, the resistivity of graphite or the like in the negative electrode material is preferably 0.01 Ω·cm or less.

An average particle size of graphite in the negative electrode material of 30 μm or more improves the PSOC life, and thus the average particle size of graphite is preferably 30 μm or more. An average particle size of graphite of 100 μm or more significantly improves the PSOC life, and thus the average particle size of graphite is preferably 100 μm or more.

By further including carbon black in the negative electrode material that contains graphite or the like and barium sulfate, a permeation short circuit can be further inhibited. The effect of carbon black of inhibiting a permeation short circuit is noticeable at a content of carbon black in the negative electrode material of 0.05 mass % or more, and thus the content of carbon black in the negative electrode material is preferably 0.05 mass % or more. Meanwhile, a content of carbon black in the negative electrode material of more than 1.0 mass % causes the paste of the negative electrode material to be too hard to fill the current collector. Thus, the content of carbon black in the negative electrode material is preferably 1.0 mass % or less.

A content of carbon black in the negative electrode material of 0.1 mass % or more enhances the effect of improving the PSOC life. Thus, the content of carbon black in the negative electrode material is preferably 0.1 mass % or more.

An oil absorption capacity of barium sulfate in the negative electrode material of 12 mL/100 g or more can further inhibit a permeation short circuit. Thus, the oil absorption capacity of barium sulfate in the negative electrode material is preferably 12 mL/100 g or more. An oil absorption capacity of barium sulfate in the negative electrode material of 12.5 mL/100 g or more produces a larger effect of inhibiting a permeation short circuit, and therefore, the oil absorption capacity of barium sulfate in the negative electrode material is more preferably 12.5 mL/100 g or more.

Use of a separator containing a synthetic resin such as polyolefin, and a content of silica ($SiO_2$) in the separator of 60 mass % or more can further inhibit a permeation short circuit. Thus, the separator is preferably a synthetic resin separator having a content of silica ($SiO_2$) of 60 mass % or more. A content of silica ($SiO_2$) in a synthetic resin separator of 70 mass % or more can markedly inhibit a permeation short circuit. Thus, the separator is more preferably a synthetic resin separator having a content of silica ($SiO_2$) of 70 mass % or more. Meanwhile, a content of silica ($SiO_2$) in the synthetic resin separator of more than 80 mass % reduces the PSOC life, and therefore, the separator is preferably a synthetic resin separator having a content of silica ($SiO_2$) of 80 mass % or less.

Inclusion of 0.02 mol/L or more of aluminum ions in the electrolyte solution significantly improves the PSOC life, and thus the concentration of aluminum ions in the electrolyte solution is preferably 0.02 mol/L or more. Inclusion of 0.03 mol/L or more of aluminum ions in the electrolyte solution markedly improves the PSOC life, and thus the concentration of aluminum ions in the electrolyte solution is preferably 0.03 mol/L or more.

Inclusion of aluminum ions in the electrolyte solution can further inhibit a permeation short circuit. Inclusion of 0.06 mol/L or more of aluminum ions in the electrolyte solution markedly inhibits a permeation short circuit. Thus, the concentration of aluminum ions in the electrolyte solution is preferably 0.06 mol/L or more.

Inclusion of 0.15 mol/L or less of aluminum ions in the electrolyte solution significantly improves the PSOC life, and thus the concentration of aluminum ions in the electrolyte solution is preferably 0.15 mol/L or less. Inclusion of 0.12 mol/L or less of aluminum ions in the electrolyte solution markedly improves the PSOC life, and thus the concentration of aluminum ions in the electrolyte solution is preferably 0.12 mol/L or less.

Inclusion of lithium ions in the electrolyte solution can further inhibit a permeation short circuit. Moreover, inclusion of 0.01 mol/L or more of lithium ions in the electrolyte solution can markedly inhibit a permeation short circuit. Thus, the concentration of lithium ions in the electrolyte solution is preferably 0.01 mol/L or more.

A concentration of lithium ions in the electrolyte solution of 0.02 mol/L or more markedly improves the PSOC life, and thus the concentration of lithium ions in the electrolyte solution is preferably 0.02 mol/L or less.

A concentration of lithium ions in the electrolyte solution of 0.22 mol/L or less significantly improves the PSOC life, and thus the concentration of lithium ions in the electrolyte solution is preferably 0.22 mol/L or less. A concentration of lithium ions in the electrolyte solution of 0.18 mol/L or less markedly improves the PSOC life, and thus the concentration of lithium ions in the electrolyte solution is preferably 0.18 mol/L or less.

A lead-acid battery according to the present invention can be used not only for idling-stop vehicles etc. to be used in a PSOC environment, but also for cyclic applications of, for example, forklift trucks because of reduced occurrence of a permeation short circuit when used in a PSOC environment. In Example, the lead-acid battery is a flooded-type lead-acid battery, but may also be a valve-regulated lead-acid battery. The lead-acid battery of the present invention is preferably a flooded-type lead-acid battery. In addition, the lead-acid battery of the present invention is less likely to cause a permeation short circuit even when it is used in a partial state of charge, and therefore, is suitable as a lead-acid battery to be used in a partial state of charge.

Example according to the invention of the present application will be shown below. In embodying the present invention, the example can be appropriately changed based on common knowledge of a person skilled in the art and on disclosures of prior arts. In the example, the negative electrode material is also referred to as a negative active material, and the positive electrode material is also referred to as a positive active material. The negative electrode plate includes a negative electrode current collector (negative electrode grid) and a negative active material (negative electrode material), and the positive electrode plate includes a positive electrode current collector (positive electrode grid) and a positive active material (positive electrode material). Solid components other than the current collectors belong to the active materials (electrode materials).

EXAMPLE

Graphite, barium sulfate, lignin as a shrink-proofing agent, and synthetic resin fibers as a reinforcing material were mixed with a lead powder produced by a ball milling method, and the resulting mixture was used as the negative active material paste. Carbon black was further included in the mixture to prepare another negative active material paste. Hereinafter, a content is expressed in a concentration (mass %) in a formed negative active material in a fully-charged condition. The term "fully-charged" refers to a state in which charge has been performed at a 5-hour rate current until the terminal voltage during charge as measured every 15 minutes exhibits a particular value (±0.01 V) three times in succession.

The content of graphite was changed in a range of from 0 mass % to 2.5 mass % with respect to the mass of the negative active material in a fully-charged condition. Although scalelike graphite and expanded graphite were used as graphite, other graphite such as earthy graphite and artificial graphite, and carbon fiber may also be used. Among graphite and carbon fiber, scalelike graphite or expanded graphite is preferred, and scalelike graphite is particularly preferred. The average particle size of scalelike graphite was changed in a range of from 5 μm to 300 μm. The resistivities of scalelike graphite and of expanded graphite as measured by a four-terminal method were changed in a range of from 0.001 Ω·cm to 0.012 Ω·cm (resistivities under pressure of 2.5 MPa).

The content of barium sulfate was changed in a range of from 0 mass % to 3.5 mass % with respect to the mass of the negative active material in a fully-charged condition. The oil absorption capacity (oil absorption capacity in accordance with JIS K-5101-13-2:2004) of barium sulfate was changed in a range of from 11.5 mL/100 g to 14.4 mL/100 g. Barium sulfate has an average primary particle size of, for example, 0.3 µm or more and 2.0 µm or less, and an average secondary particle size of, for example, 1.0 µm or more and 10 µm or less. While the content of lignin was 0.2 mass %, the content is not limited. A synthetic shrink-proofing agent such as a condensate of a sulfonated bisphenol may be used in place of lignin. While the content of the reinforcing material was 0.1 mass %, the content and the type of the synthetic resin fibers are not limited. The method for producing a lead powder, the content of oxygen, and so on are not limited. Other additives such as a water-soluble synthetic polymer may be contained.

The above-mentioned mixture was formed into a paste with water and sulfuric acid. An expanded type of negative electrode grid (110 mm (height)×100 mm (width)×1.0 mm (thickness)) primarily composed of an antimony-free Pb—Ca—Sn-based alloy was filled with this paste, which was then cured and dried. The negative electrode grid may also be a cast grid, a punched grid, or the like. The mass of the negative active material per one negative electrode plate was adjusted in a range of 30 g or more and 80 g or less. The density of the negative active material after formation is preferably in a range of, for example, 3.6 g/cm$^3$ or more and 4.0 g/cm$^3$ or less.

Synthetic resin fibers of a reinforcing material in an amount of 0.1 mass % with respect to the mass of the formed positive active material in a fully-charged condition were mixed with a lead powder produced by a ball milling method, and the resulting mixture was formed into a paste with water and sulfuric acid, and was used as the positive active material paste. An expanded type of positive electrode grid (110 mm (height)×100 mm (width)×1.2 mm (thickness)) primarily composed of an antimony-free Pb—Ca—Sn-based alloy was filled with this paste, which was then cured and dried. The type of the lead powder and production conditions are not limited. The positive electrode grid may also be a cast grid, a punched grid, or the like.

An unformed negative electrode plate was wrapped with a polyethylene separator with ribs protruding from a base, and seven unformed negative electrode plates and six unformed positive electrode plates were alternately layered. The negative electrode plates and the positive electrode plates were connected to one another with a strap to prepare an element. The thickness of the base of a separator is preferably, for example, 0.15 mm or more and 0.25 mm or less. Six elements connected in series were placed in a cell chamber of a container, and sulfuric acid with a specific gravity of 1.230 at 20° C. was added to perform formation in the container, thereby preparing a flooded-type lead-acid battery having a B20 size and a 5-hour rate capacity of 30 Ah. The average plate interval S (hereinafter sometimes referred to as an "electrode interval" in abbreviation) between the positive electrode plate and the negative electrode plate was adjusted in a range of 0.3 mm or more and 1.0 mm or less. The ratio (N/P) of the mass N of the negative active material to the mass P of the positive active material per lead-acid battery is preferably, for example, 0.62 or more and 0.95 or less.

FIG. 1 shows a part of a lead-acid battery 2. Reference numeral 4 denotes a negative electrode plate, reference numeral 6 denotes a positive electrode plate, reference numeral 8 denotes a separator, and reference numeral 10 denotes an electrolyte solution mainly composed of sulfuric acid. The negative electrode plate 4 includes a negative electrode grid 12 and a negative active material 14. The positive electrode plate 6 includes a positive electrode grid 16 and a positive active material 18. The separator 8 is in the form of a bag including a base 20 and ribs 22. A negative electrode is stored in the bag, and the ribs 22 face the positive electrode plate 6 side. However, the positive electrode plate 6 may be stored in the separator 8 with the ribs 22 facing the positive electrode plate. The separator is not required to be in the form of a bag as long as it isolates the positive electrode plate and the negative electrode plate from each other; the separator may be, for example, a leaflet-like glass mat or retainer mat. S' is the interval between plates (interval between the surface of the positive active material and the surface of the negative active material). The average thereof is the average plate interval S. Assuming that the direction in which the lugs of the positive and negative electrode plates protrude is the upside, S' is defined as the interval between the plates at the top ends of the active material surfaces of the positive and negative electrode plates.

The average plate interval (electrode interval) S is determined by subtracting the thickness(es) of the negative electrode plate(s) and the thickness(es) of the positive electrode plate(s) from the thickness of an element, and dividing the obtained value by (the total number of plates per element −1). The thickness of an element is the length between the outer ends, along the layering direction, of the plates located at both ends of that element, that is, the length between the outer active material surfaces, along the layering direction, of the plates located at both ends of that element. The thickness of an element, the thickness of a positive electrode plate, and the thickness of a negative electrode plate are each determined at the top ends of the active material surfaces of the positive and/or negative electrode plate(s). In addition, the average plate interval S and the thickness of an element are each a dimension when the element is accommodated in the container, and is in a fully-charged condition.

The content of barium contained in a formed negative active material is quantitatively determined as follows. The lead-acid battery in a fully-charged condition is disassembled, and the negative electrode plate is washed with water, and then dried, to remove the sulfuric acid component. Thus, the negative active material is collected. The negative active material is crushed, and hydrogen peroxide water having a concentration of 300 g/L is added thereto in an amount of 20 mL per 100 g of the negative active material, and (1+3) nitric acid that is obtained by diluting one part by volume of 60 mass % concentrated nitric acid with 3 parts by volume of ion-exchange water is further added. The mixture is then heated with stirring for five hours to allow lead to dissolve in the form of lead nitrate. Barium sulfate is further dissolved. The concentration of barium in the resultant solution is quantitatively determined by an atomic absorption measurement method, and the result is converted into the content of barium in the negative active material. The content of barium in the negative active material can then provide the content of barium sulfate in the negative active material.

The mass of the negative active material per one negative electrode plate, and the contents of graphite and of carbon black contained in the formed negative active material are quantitatively determined as follows. The lead-acid battery 2 in a fully-charged condition is disassembled, and the negative electrode plate 4 is washed with water, and then dried, to remove the sulfuric acid component. Thus, the negative active material 14 is collected, and the mass of the negative active material per one negative electrode plate is measured. The negative active material is crushed, and hydrogen peroxide water having a concentration of 300 g/L is added thereto in an amount of 20 mL per 100 g of the negative active material, and (1+3) nitric acid that is obtained by diluting 1 part by volume of 60 mass % concentrated nitric acid with 3 parts by volume of ion-exchange water is further added. The mixture is then heated with stirring for five hours to allow lead to dissolve in the form of lead nitrate. Barium sulfate is further dissolved. Filtration is then performed to separate graphite, carbon black, and the reinforcing material.

Solid components obtained by filtration (graphite, carbon black, and the reinforcing material) are dispersed in water. Using a sieve that retains the reinforcing material, such as, for example, a sieve having an aperture of 1.4 mm, the dispersion solution is sieved twice, and then washed with water to remove the reinforcing material, thereby separating carbon black and graphite.

An organic shrink-proofing agent, such as lignin, is added to the negative active material paste together with carbon black and graphite. Due to the surface-active effect of the organic shrink-proofing agent, carbon black and graphite remain in a non-aggregated state in the negative active material even after formation. However, since the organic shrink-proofing agent is dissolved in water and lost in the series of separation operations, carbon black and graphite are dispersed in water, the organic shrink-proofing agent is then added, and the mixture is stirred to disaggregate again the aggregates of carbon black and of graphite, after which the following separation operation is performed.

The organic shrink-proofing agent is not limited as long as it can be added to a lead-acid battery. In Example, a lignin sulfonate Vanillex N (manufactured by NIPPON PAPER INDUSTRIES CO., LTD.) was used. In Example, 15 g of the organic shrink-proofing agent was added to 100 mL of water, and a stirring operation was performed.

After the aforementioned operation, carbon black and graphite were separated from each other by making suspension containing carbon black and graphite pass through a sieve that does not substantially allow graphite to pass therethrough, but allows carbon black to pass therethrough. In Example, a sieve with an aperture of 20 μm was used. Even when graphite having a particle size of less than this aperture is used, graphite having a particle size of 3 μm or more causes clogging of the sieve, and thus such graphite will not substantially pass through the sieve. After this operation, graphite remains on the sieve, and carbon black is contained in the liquid that has passed through the sieve.

Graphite and carbon black separated in the series of operations are washed with water and dried, and are then each weighed. Carbon fiber can be separated in a manner similar to that of graphite.

The average particle size (volume average size) of graphite is measured by a light scattering method while the separated graphite is dispersed again in water to which an organic shrink-proofing agent has been added. A region corresponding to a particle size of less than 3 μm, if any, is ignored as that of an impurity such as carbon black. The resistivity of graphite is measured by a four-terminal method during application of a pressure of 2.5 MPa to a graphite powder that has been washed with water and dried.

The oil absorption capacity of barium sulfate in the negative active material is measured as follows. The lead-acid battery 2 is in a fully-charged condition is disassembled, and the negative electrode plate 4 is washed with water, and then dried, to remove the sulfuric acid component. Thus, the negative active material 14 is collected. The negative active material is crushed, and hydrogen peroxide water having a concentration of 300 g/L is added thereto in an amount of 20 mL per 100 g of the negative active material, and (1+3) nitric acid that is obtained by diluting 1 part by volume of 60 mass % concentrated nitric acid with 3 parts by volume of ion-exchange water is further added. The mixture is then heated with stirring for five hours to allow lead to dissolve in the form of lead nitrate. Graphite, carbon black, barium sulfate and the reinforcing material are then separated by filtration.

The solid components obtained by filtration are dispersed in water. Using a sieve that retains the reinforcing material, such as a sieve having an aperture of 1.4 mm, the dispersion solution is sieved twice, and then washed with water to remove the reinforcing material. Next, the dispersion solution without the reinforcing material is subjected to centrifugal separation at 3000 rpm for five minutes. The supernatant and an upper layer of the precipitate, both of which contain carbon black and graphite, are discarded, and barium sulfate is extracted from a lower layer of the precipitate. The barium sulfate extracted is washed with water and dried, and the oil absorption capacity is measured in accordance with JIS K-5101-13-2:2004.

Aluminum ions and lithium ions in the electrolyte solution are quantitatively determined by extracting the electrolyte solution, and then using ICP emission spectrometry.

The content of silica ($SiO_2$) in a separator is quantitatively determined as follows. First, the lead-acid battery 2 is disassembled to single out a separator, which is then washed with water and dried, and the dry weight is measured. Next, the separator is completely burned, and the content of Si in the residue after burning is quantitatively determined using ICP emission spectrometry. The content of silica ($SiO_2$) in the separator is calculated from the dry weight of the separator and from the content of Si in the residue after burning.

Figure 2:
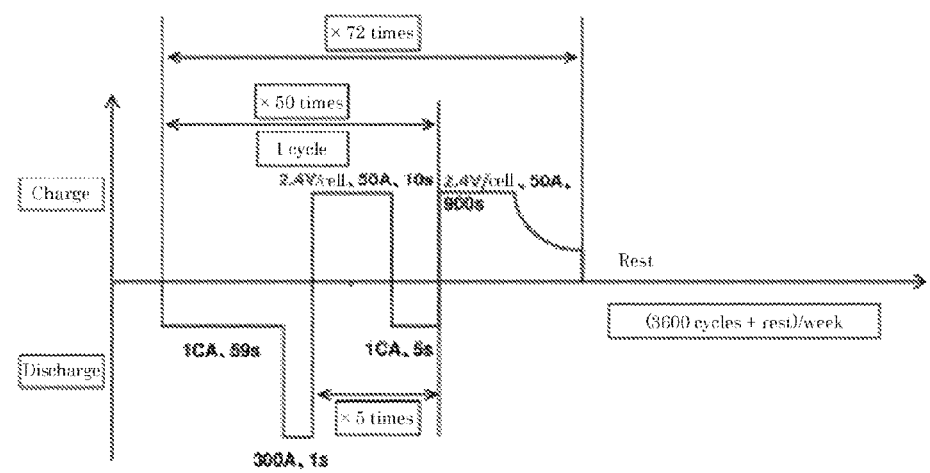
FIG. 2 is a diagram showing a PSOC life test in the example.

A permeation short circuit accelerating test and a PSOC life test were conducted on the lead-acid battery 2 in a fully-charged condition. Details of the PSOC life test are shown in FIG. 2 and in Table 1. The denotation "1 CA" means, for example, 30 A for a battery having a 5-hour rate capacity of 30 Ah. The term 40° C. air indicates that the test was conducted in an air bath at 40° C. The number of cycles until the terminal voltage reaches 1.2 V/cell in the test pattern in Table 1 is defined as a PSOC life. Details of the permeation short circuit accelerating test are shown in Table 2. This test is a test that is conducted under conditions that promote occurrence of a permeation short circuit. Thus, the rate of occurrence of a permeation short circuit is significantly higher than that under the actual conditions of use of the lead-acid battery. Five cycles of the permeation short circuit accelerating test pattern shown in Table 2 were conducted. After the 5 cycles, the lead-acid batteries were disassembled to determine the ratio of lead-acid batteries in which short circuits have occurred (permeation short circuit occurrence rate). The term 25° C. water indicates that the test was conducted in a water bath at 25° C. In Tables 1 and 2, CC discharge, CV charge, and CC charge respectively mean constant current discharge, constant voltage charge, and constant current charge.

TABLE 1

| | | Test conditions | | |
|---|---|---|---|---|
| Step | Details | Current and voltage | Stop condition | Temperature |
| 1 | CC discharge | 1 CA | 59 sec. | 40° C. air |
| 2 | CC discharge | 300 A | 1 sec. | 40° C. air |
| 3 | CV charge | 2.4 V/cell, max. 50 A | 10 sec. | 40° C. air |
| 4 | CC discharge | 1 CA | 5 sec. | 40° C. air |
| 5 | Repeat steps 3 and 4 | 5 times | | 40° C. air |
| 6 | Repeat steps 1-5 | 50 times | | 40° C. air |
| 7 | CV charge | 2.4 V/cell, max. 50 A | 900 sec. | 40° C. air |
| 8 | Repeat steps 1-7 | 72 times | | 40° C. air |
| 9 | Rest | 15 h | | 40° C. air |
| 10 | Return to step 1 | — | | 40° C. air |

TABLE 2

| | | Test conditions | | |
|---|---|---|---|---|
| Step | Details | Current and voltage | Stop condition | Temperature |
| 1 | CC discharge | 0.05 CA | 1.0 V/cell | 25° C. water |
| 2 | Left with Resistance connected | 10 Ω | 28 days | 25° C. water |
| 3 | CV charge | 2.4 V/cell, max 50 A | 10 min. | 25° C. water |
| 4 | CC charge | 0.05 CA | 27 hours | 25° C. water |
| 5 | Repeat steps 1-4 | 5 times | | 25° C. water |

The results of the PSOC life test and of the permeation short circuit accelerating test are shown in Table 3, and main results are extracted into FIGS. 3 to 13. Data of the PSOC life is shown as a relative value with respect to the value of the sample 1C set as 1. The graphites shown in Table 3 are as follows.

Graphite 1: scalelike graphite having an average particle size of 100 μm and a resistivity of 0.001 Ω·cm.

Graphite 2: expanded graphite having an average particle size of 30 μm and a resistivity of 0.01 Ω·cm.

Graphite 3: expanded graphite having an average particle size of 30 μm and a resistivity of 0.012 Ω·cm.

Graphite 4: scalelike graphite having an average particle size of 5 μm and a resistivity of 0.001 Ω·cm.

Graphite 5: scalelike graphite having an average particle size of 30 μm and a resistivity of 0.001 Ω·cm.

Graphite 6: scalelike graphite having an average particle size of 300 μm and a resistivity of 0.001 Ω·cm.

TABLE 3

| No. | Graphite Type | Graphite Content (mass %) | Graphite Average particle size (μm) | Graphite Resistivity (Ω·cm) | Inter-electrode ratio Amount of negative active material per one negative electrode plate (g) | Inter-electrode ratio Average plate interval (mm) | Inter-electrode ratio Inter-electrode ratio (mm/g) | Ba sulfate Content (mass %) | Ba sulfate Oil absorption capacity (ml/100 g) | Al ion Concentration (mol/L) | Li ion Concentration (mol/L) | Carbon black Content (mass %) | Silica in separator Content (mass %) | Test results PSOC life (ratio to 1C) | Test results Permeation short circuit occurrence rate (%) |
|---|---|---|---|---|---|---|---|---|---|---|---|---|---|---|---|
| 1C | Not added | — | — | — | 45 | 0.7 | 0.016 | 0.6 | 12.5 | 0 | 0 | 0.2 | 65 | 1 | 10 |
| 2 | Graphite 1 | 0.5 | 100 | 0.001 | 45 | 0.7 | 0.016 | 0.6 | 12.5 | 0 | 0 | 0 | 65 | 0.85 | 20 |
| 3C | Not added | — | — | — | 45 | 0.7 | 0.016 | 0.6 | 12.5 | 0 | 0 | 0 | 65 | 0.70 | 10 |
| 4C | Not added | — | — | — | 45 | 0.7 | 0.016 | 0.6 | 12.5 | 0.04 | 0.06 | 0.2 | 65 | 1.20 | 20 |
| 5 | Graphite 1 | 1.5 | 100 | 0.001 | 45 | 0.7 | 0.016 | 2 | 12.5 | 0 | 0 | 0 | 65 | 1.26 | 10 |
| 6 | Graphite 1 | 0.3 | 100 | 0.001 | 45 | 0.7 | 0.016 | 2 | 12.5 | 0 | 0 | 0 | 65 | 1.13 | 0 |
| 7 | Graphite 1 | 0.5 | 100 | 0.001 | 45 | 0.7 | 0.016 | 2 | 12.5 | 0 | 0 | 0 | 65 | 1.20 | 0 |
| 8 | Graphite 1 | 2.0 | 100 | 0.001 | 45 | 0.7 | 0.016 | 2 | 12.5 | 0 | 0 | 0 | 65 | 1.27 | 10 |
| 9 | Graphite 1 | 2.5 | 100 | 0.001 | 45 | 0.7 | 0.016 | 2 | 12.5 | 0 | 0 | 0 | 65 | 1.18 | 30 |
| 10C | Graphite 1 | 1.5 | 100 | 0.001 | 45 | 0.7 | 0.016 | 0 | 12.5 | 0 | 0 | 0 | 65 | 1.01 | 50 |
| 11 | Graphite 1 | 1.5 | 100 | 0.001 | 45 | 0.7 | 0.016 | 0.6 | 12.5 | 0 | 0 | 0 | 65 | 1.16 | 30 |
| 12 | Graphite 1 | 1.5 | 100 | 0.001 | 45 | 0.7 | 0.016 | 1.2 | 12.5 | 0 | 0 | 0 | 65 | 1.18 | 10 |
| 13 | Graphite 1 | 1.5 | 100 | 0.001 | 45 | 0.7 | 0.016 | 3 | 12.5 | 0 | 0 | 0 | 65 | 1.29 | 0 |
| 14 | Graphite 1 | 1.5 | 100 | 0.001 | 45 | 0.7 | 0.016 | 3.5 | 12.5 | 0 | 0 | 0 | 65 | 1.18 | 0 |
| 15C | Graphite 1 | 1.5 | 100 | 0.001 | 45 | 0.3 | 0.007 | 2 | 12.5 | 0 | 0 | 0 | 65 | 1.13 | 50 |
| 16 | Graphite 1 | 1.5 | 100 | 0.001 | 45 | 0.5 | 0.011 | 2 | 12.5 | 0 | 0 | 0 | 65 | 1.39 | 10 |
| 17 | Graphite 1 | 1.5 | 100 | 0.001 | 45 | 0.9 | 0.020 | 2 | 12.5 | 0 | 0 | 0 | 65 | 1.13 | 0 |
| 18 | Graphite 1 | 1.5 | 100 | 0.001 | 45 | 1 | 0.022 | 2 | 12.5 | 0 | 0 | 0 | 65 | 1.01 | 0 |
| 19C | Graphite 1 | 1.5 | 100 | 0.001 | 80 | 0.7 | 0.009 | 2 | 12.5 | 0 | 0 | 0 | 65 | 1.24 | 50 |
| 20 | Graphite 1 | 1.5 | 100 | 0.001 | 70 | 0.7 | 0.010 | 2 | 12.5 | 0 | 0 | 0 | 65 | 1.51 | 10 |
| 21 | Graphite 1 | 1.5 | 100 | 0.001 | 60 | 1 | 0.017 | 2 | 12.5 | 0 | 0 | 0 | 65 | 1.50 | 10 |
| 22 | Graphite 1 | 1.5 | 100 | 0.001 | 40 | 0.5 | 0.013 | 2 | 12.5 | 0 | 0 | 0 | 65 | 1.31 | 10 |
| 23 | Graphite 1 | 1.5 | 100 | 0.001 | 45 | 0.7 | 0.018 | 2 | 12.5 | 0 | 0 | 0 | 65 | 1.13 | 0 |
| 24 | Graphite 1 | 1.5 | 100 | 0.001 | 30 | 0.4 | 0.013 | 2 | 12.5 | 0 | 0 | 0 | 65 | 1.30 | 10 |
| 25 | Graphite 1 | 1.5 | 100 | 0.001 | 30 | 0.7 | 0.023 | 2 | 12.5 | 0 | 0 | 0 | 65 | 1.01 | 10 |
| 26 | Graphite 2 | 1.5 | 30 | 0.01 | 45 | 0.7 | 0.016 | 2 | 12.5 | 0 | 0 | 0 | 65 | 1.12 | 10 |
| 27 | Graphite 3 | 1.5 | 30 | 0.012 | 45 | 0.7 | 0.016 | 2 | 12.5 | 0 | 0 | 0 | 65 | 0.88 | 30 |
| 28 | Graphite 4 | 1.5 | 5 | 0.001 | 45 | 0.7 | 0.016 | 2 | 12.5 | 0 | 0 | 0 | 65 | 1.10 | 0 |
| 29 | Graphite 5 | 1.5 | 30 | 0.001 | 45 | 0.7 | 0.016 | 2 | 12.5 | 0 | 0 | 0 | 65 | 1.20 | 10 |
| 30 | Graphite 6 | 1.5 | 300 | 0.001 | 45 | 0.7 | 0.016 | 2 | 12.5 | 0 | 0 | 0 | 65 | 1.24 | 10 |
| 31 | Graphite 1 | 1.5 | 100 | 0.001 | 45 | 0.7 | 0.016 | 2 | 12.5 | 0.02 | 0 | 0 | 65 | 1.31 | 10 |
| 32 | Graphite 1 | 1.5 | 100 | 0.001 | 45 | 0.7 | 0.016 | 2 | 12.5 | 0.03 | 0 | 0 | 65 | 1.45 | 0 |
| 33 | Graphite 1 | 1.5 | 100 | 0.001 | 45 | 0.7 | 0.016 | 2 | 12.5 | 0.06 | 0 | 0 | 65 | 1.64 | 0 |
| 34 | Graphite 1 | 1.5 | 100 | 0.001 | 45 | 0.7 | 0.016 | 2 | 12.5 | 0.12 | 0 | 0 | 65 | 1.52 | 0 |
| 35 | Graphite 1 | 1.5 | 100 | 0.001 | 45 | 0.7 | 0.016 | 2 | 12.5 | 0.15 | 0 | 0 | 65 | 1.36 | 0 |
| 36 | Graphite 1 | 1.5 | 100 | 0.001 | 45 | 0.7 | 0.016 | 2 | 12.5 | 0 | 0.01 | 0 | 65 | 1.32 | 0 |
| 37 | Graphite 1 | 1.5 | 100 | 0.001 | 45 | 0.7 | 0.016 | 2 | 12.5 | 0 | 0.02 | 0 | 65 | 1.46 | 0 |
| 38 | Graphite 1 | 1.5 | 100 | 0.001 | 45 | 0.7 | 0.016 | 2 | 12.5 | 0 | 0.09 | 0 | 65 | 1.62 | 0 |
| 39 | Graphite 1 | 1.5 | 100 | 0.001 | 45 | 0.7 | 0.016 | 2 | 12.5 | 0 | 0.18 | 0 | 65 | 1.54 | 0 |
| 40 | Graphite 1 | 1.5 | 100 | 0.001 | 45 | 0.7 | 0.016 | 2 | 12.5 | 0 | 0.22 | 0 | 65 | 1.34 | 0 |

TABLE 3-continued

| | | Graphite | | | Inter-electrode ratio | | | Ba sulfate | | Al ion Concentration (mol/L) | Li ion Concentration (mol/L) | Carbon black Content (mass %) | Silica in separator Content (mass %) | Test results | |
|---|---|---|---|---|---|---|---|---|---|---|---|---|---|---|---|
| No. | Type | Content (mass %) | Average particle size (μm) | Resistivity (Ω·cm) | Amount of negative active material per one negative electrode plate (g) | Average plate interval (mm) | Inter-electrode ratio (mm/g) | Content (mass %) | Oil absorption capacity (ml/100 g) | | | | | PSOC life (ratio to 1C) | Permeation short circuit occurrence rate (%) |
| 41 | Graphite 1 | 1.5 | 100 | 0.001 | 45 | 0.7 | 0.016 | 2 | 12.5 | 0 | 0 | 0.05 | 65 | 1.28 | 0 |
| 42 | Graphite 1 | 1.5 | 100 | 0.001 | 45 | 0.7 | 0.016 | 2 | 12.5 | 0 | 0 | 0.1 | 65 | 1.32 | 0 |
| 43 | Graphite 1 | 1.5 | 100 | 0.001 | 45 | 0.7 | 0.016 | 2 | 12.5 | 0 | 0 | 1 | 65 | 1.45 | 0 |
| 44 | Graphite 1 | 1.5 | 100 | 0.001 | 45 | 0.7 | 0.016 | 2 | 12.5 | 0 | 0 | 1.2 | 65 | * | * |
| 45 | Graphite 1 | 2 | 100 | 0.001 | 45 | 0.7 | 0.016 | 3 | 12.5 | 0 | 0 | 0 | 65 | 1.31 | 10 |
| 46 | Graphite 1 | 2 | 100 | 0.001 | 45 | 0.7 | 0.016 | 3 | 12.5 | 0 | 0 | 0.1 | 65 | 1.37 | 0 |
| 47 | Graphite 1 | 2 | 100 | 0.001 | 45 | 0.7 | 0.016 | 2 | 12.5 | 0 | 0 | 1 | 65 | 1.50 | 0 |
| 48 | Graphite 1 | 1.5 | 100 | 0.001 | 45 | 0.7 | 0.016 | 2 | 12.5 | 0 | 0 | 0 | 50 | 1.13 | 20 |
| 49 | Graphite 1 | 1.5 | 100 | 0.001 | 45 | 0.7 | 0.016 | 2 | 12.5 | 0 | 0 | 0 | 60 | 1.23 | 10 |
| 50 | Graphite 1 | 1.5 | 100 | 0.001 | 45 | 0.7 | 0.016 | 2 | 12.5 | 0 | 0 | 0 | 70 | 1.39 | 0 |
| 51 | Graphite 1 | 1.5 | 100 | 0.001 | 45 | 0.7 | 0.016 | 2 | 12.5 | 0 | 0 | 0 | 80 | 1.20 | 0 |
| 52 | Graphite 1 | 2 | 100 | 0.001 | 45 | 0.7 | 0.016 | 3 | 12.5 | 0 | 0 | 0 | 60 | 1.28 | 20 |
| 53 | Graphite 1 | 2 | 100 | 0.001 | 45 | 0.7 | 0.016 | 3 | 12.5 | 0 | 0 | 0 | 70 | 1.44 | 10 |
| 54 | Graphite 1 | 1.5 | 100 | 0.001 | 45 | 0.7 | 0.016 | 2 | 11.5 | 0 | 0 | 0 | 65 | 1.10 | 15 |
| 55 | Graphite 1 | 1.5 | 100 | 0.001 | 45 | 0.7 | 0.016 | 2 | 14.4 | 0 | 0 | 0 | 65 | 1.30 | 5 |

Figure 3:
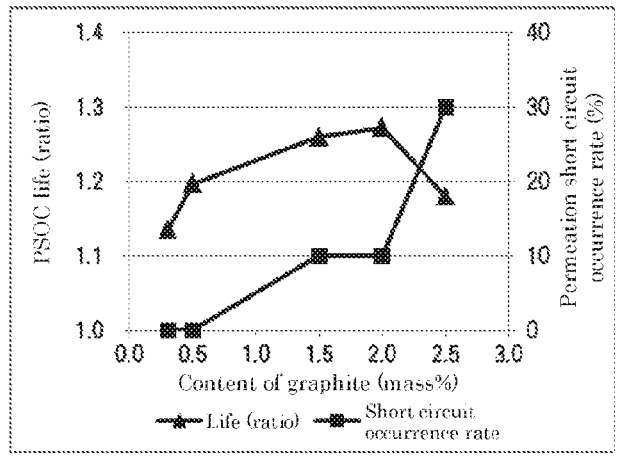
FIG. 3 is a characteristic diagram showing the influence of the content of graphite (Samples 5 to 9 of Table 3).

* The paste was hard, and therefore preparation was impossible.
1C, 3C, 4C, 10C, 15C, 19C: comparative examples FIG. 3 and Table 3 show that inclusion of graphite in the negative active material improves the PSOC life, that inclusion of 0.5 mass % or more of graphite significantly improves the PSOC life, and that inclusion of 1.5 mass % or more of graphite markedly improves the PSOC life. Meanwhile, it can be seen that inclusion of graphite in the negative active material promotes occurrence of a permeation short circuit, while the content of graphite in the negative active material of less than 2.5 mass % inhibits a permeation short circuit. A content of graphite in the negative active material of 2.0 mass % or less has an especially large effect of inhibiting a permeation short circuit. Since it was not known that graphite in the negative active material relates to a permeation short circuit, such an effect was not foreseeable.

Thus, the present inventors conducted studies on inhibition of occurrence of a permeation short circuit while graphite is included in the negative active material to improve the PSOC life. As a result, it has been found that inclusion of graphite and barium sulfate in the negative active material, and an inter-electrode ratio S/W of 0.01 mm/g or more yield a lead-acid battery having excellent permeation short circuit resistance performance, and having PSOC life performance higher than that of a lead-acid battery not containing graphite or the like in the negative active material (e.g., samples 5 to 8 of Table 3). It is inferred in general that a small average plate interval S would cause a permeation short circuit to easily occur due to the small distance between the positive and negative electrode plates, thereby producing only a small effect of inhibiting a permeation short circuit. However, even when the value of S is low, a low amount W of the negative active material per one negative electrode plate produces a large effect of inhibiting a permeation short circuit (sample 24 of Table 3). In contrast, even when the value of S is higher than that of sample 24, a high value of W produces only a small effect of inhibiting a permeation short circuit (sample 19C of Table 3). Thus, an effect of inhibiting a permeation short circuit is not dependent on S or W alone, but both S and W relate to a permeation short circuit. It is thus important that the inter-electrode ratio S/W be 0.01 mm/g or more to inhibit a permeation short circuit.

Without satisfying even any one of a condition in which the negative active material contains graphite, a condition in which the negative active material contains barium sulfate, and a condition in which the inter-electrode ratio S/W is 0.01 mm/g or more, a lead-acid battery having excellent PSOC life performance and excellent permeation short circuit resistance performance cannot be obtained. For example, even when the negative active material contains barium sulfate, and the inter-electrode ratio S/W is 0.01 mm/g or more, PSOC life performance is low if the negative active material does not contain graphite (sample 3C of Table 3). In addition, even when the negative active material contains graphite, and the inter-electrode ratio S/W is 0.01 mm/g or more, a permeation short circuit cannot be sufficiently inhibited if the negative active material does not contain barium sulfate (sample 10C of Table 3). Similarly even when the negative active material contains graphite and barium sulfate, a permeation short circuit cannot be sufficiently inhibited if the inter-electrode ratio S/W is less than 0.01 mm/g (15C and 19C of Table 3). Thus, concludingly, the combination of three configurations, including a configuration in which the negative active material contains graphite, a configuration in which the negative active material contains barium sulfate, and a configuration in which the inter-electrode ratio S/W is 0.01 mm/g or more, is required to obtain a lead-acid battery having excellent PSOC life performance and excellent permeation short circuit resistance performance. Since it was not known that barium sulfate in the negative active material relates to occurrence of a permeation short circuit, it is not easy for a person skilled in the art to get an idea to include barium sulfate in the negative active material to inhibit a permeation short circuit. In addition, it was also not known that the inter-electrode ratio S/W relates to occurrence of a permeation short circuit, and therefore, it is also not easy for a person skilled in the art to get an idea to set the inter-electrode ratio S/W to 0.01 mm/g or more to inhibit a permeation short circuit. Moreover, it was not known that inclusion of graphite in the negative active material causes a permeation short circuit to easily occur. Thus, it is very difficult for a person skilled in the art to get an idea of combining inclusion of barium sulfate in the negative active material with setting the inter-electrode ratio S/W to 0.01 mm/g or more to inhibit a permeation short circuit, which occurs more easily by including graphite in the negative active material.

Figure 4:
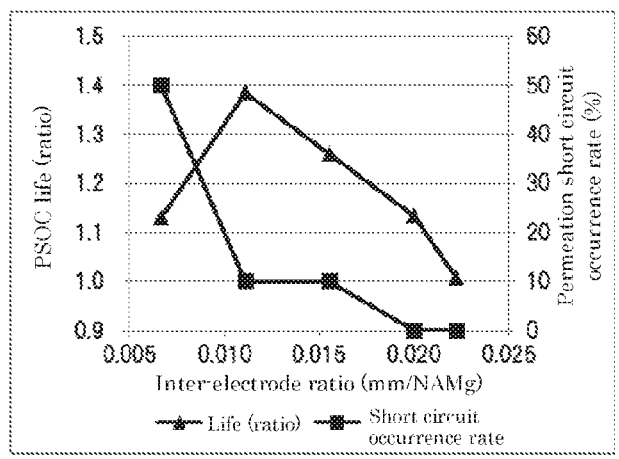
FIG. 4 is a characteristic diagram showing the influence of the inter-electrode ratio (Samples 5, 15C, and 16 to 18 of Table 3).
Figure 5:
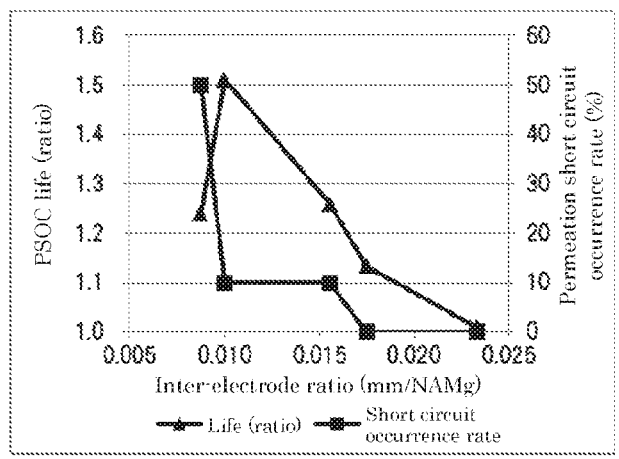
FIG. 5 is a characteristic diagram showing the influence of the inter-electrode ratio (Samples 5, 19C, 20, 23, and 25 of Table 3).

Effects of the inter-electrode ratio S/W are shown in FIGS. 4 and 5. FIG. 4 shows the results when the amount W of the negative active material per one negative electrode plate was fixed, while the electrode interval (average plate interval) S was varied. FIG. 5 shows the results when the electrode interval S was fixed, while the amount W of the negative active material per one negative electrode plate was varied. The results are similar between when the electrode interval S was varied and when the amount W of the negative active material per one negative electrode plate was varied. The fact that the change in S/W caused by a variation in S and the change in S/W caused by a variation in W have produced similar results shows that it is the ratio S/W that has engineering significance, not S or W alone. In addition, FIGS. 4 and 5 show that, when the negative active material contains graphite and barium sulfate, the effect of inhibiting a permeation short circuit is completely different between when the inter-electrode ratio S/W is less than 0.01 mm/g and when the inter-electrode ratio S/W is 0.01 mm/g. Thus, it can be said that an inter-electrode ratio of 0.01 mm/g or more has a meaning as a critical point.

FIGS. 4 and 5 show that the PSOC life performance improves when the inter-electrode ratio S/W is 0.02 mm/g or less. The PSOC life performance significantly improves when the inter-electrode ratio S/W is 0.16 mm/g or less.

Figure 6:
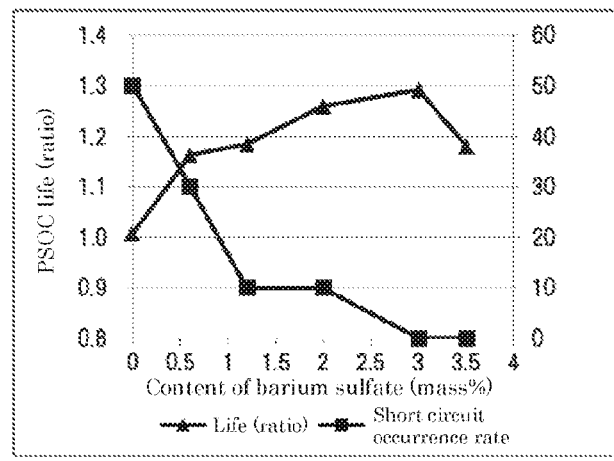
FIG. 6 is a characteristic diagram showing the influence of the content of barium sulfate (Samples 5, 10C, and 11 to 14 of Table 3).

FIG. 6 shows that a content of barium sulfate in the negative active material of 0.6 mass % or more significantly improves the effect of inhibiting a permeation short circuit. Since it was not known that barium sulfate in the negative active material relates to a permeation short circuit, such an effect was not foreseeable. A content of barium sulfate in the negative active material of 1.2 mass % or more especially significantly improves the effect of inhibiting a permeation short circuit. The effect of inhibiting a permeation short circuit is completely different between when the content of barium sulfate is less than 1.2 mass % and when the content of barium sulfate is 1.2 mass % or more. Thus, it can be said that a content of barium sulfate of 1.2 mass % or more has a meaning as a critical point.

FIG. 6 shows that a content of barium sulfate in the negative active material of 3.5 mass % or less improves the PSOC life performance, and that a content of barium sulfate in the negative active material of 3.0 mass % or less significantly improves the PSOC life performance.

Table 3 shows that when the negative active material contains graphite, a permeation short circuit may not be completely inhibited even when the negative active material contains barium sulfate, and the inter-electrode ratio S/W is 0.01 mm/g or more (e.g., sample 5 of Table 3). Thus, the present inventors have conducted studies on further inhibiting a permeation short circuit.

Figure 7:
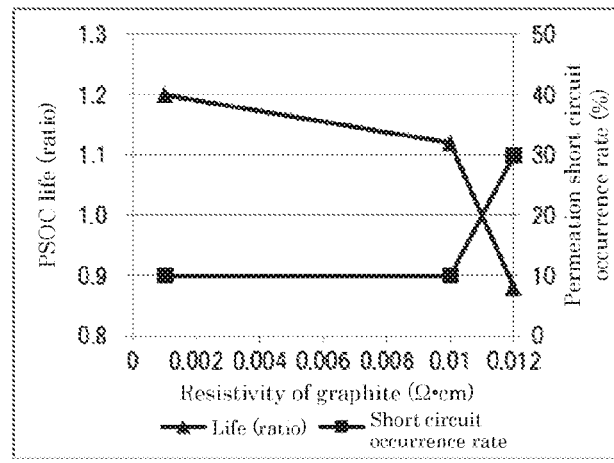
FIG. 7 is a characteristic diagram showing the influence of the resistivity of graphite (Samples 26, 27, and 29 of Table 3).

FIG. 7 shows that a resistivity of graphite in the negative active material of 0.01 Ω·cm or less further inhibits a permeation short circuit. Since it was not known that graphite in the negative active material relates to a permeation short circuit, it was not foreseeable that changing the resistivity of graphite in the negative active material would improve the effect of inhibiting a permeation short circuit.

Figure 8:
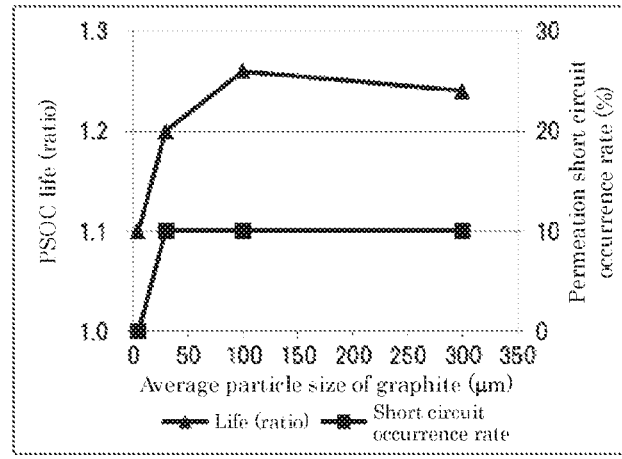
FIG. 8 is a characteristic diagram showing the influence of the particle size of graphite (Samples 5 and 28 to 30 of Table 3).

FIG. 8 shows that an average particle size of graphite of 30 μm or more improves the PSOC life, and an average particle size of graphite of 100 μm or more further improves the PSOC life.

Figure 9:
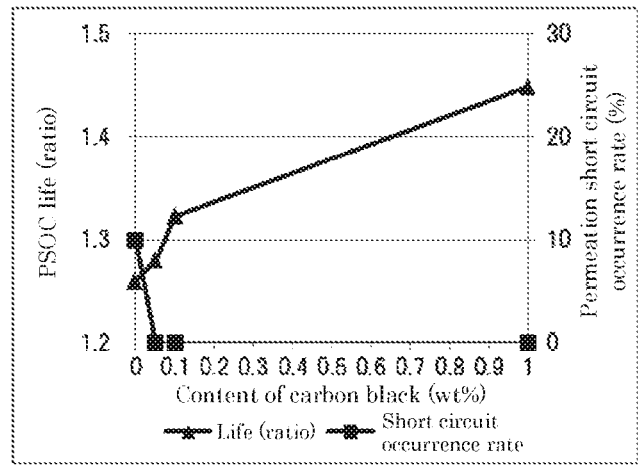
FIG. 9 is a characteristic diagram showing the influence of the content of carbon black (Samples 5 and 41 to 43 of Table 3).

FIG. 9 shows effects of carbon black in the negative active material. It can be seen that inclusion of carbon black in the negative active material further inhibits occurrence of a permeation short circuit. It was not known that carbon black in the negative active material relates to a permeation short circuit. Therefore, it was not foreseeable that inclusion of carbon black in the negative active material would improve the effect of inhibiting a permeation short circuit. In addition, comparison between samples 1 and 3 of Table 3 shows that when the negative active material does not contain graphite, the effect of inhibiting a permeation short circuit cannot be obtained even when the negative active material contains carbon black. Thus, the effect of carbon black of inhibiting a permeation short circuit is obtained only when the negative active material contains graphite.

The effect of carbon black of inhibiting a permeation short circuit is noticeable when the content of carbon black in the negative active material is 0.05 mass % or more (FIG. 9). Moreover, a content of carbon black in the negative electrode material of 0.1 mass % or more produces a larger effect of improving the PSOC life than when the content of carbon black in the negative active material is less than 0.1 mass % (FIG. 9). Meanwhile, inclusion of more than 1.0 mass % of carbon black in the negative active material made the active material paste too hard to fill therewith the negative electrode current collector.

Figure 10:
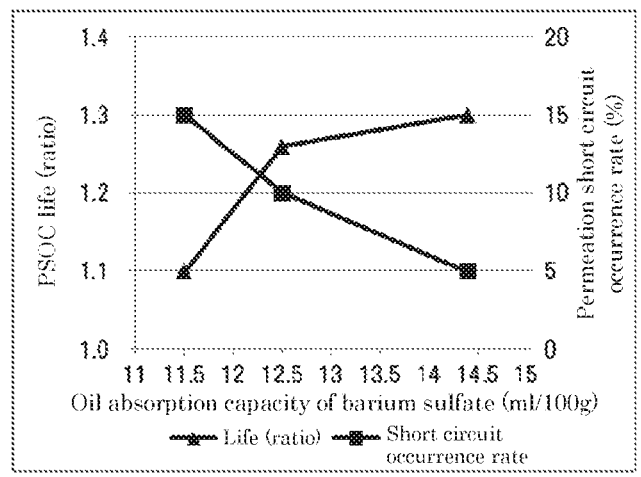
FIG. 10 is a characteristic diagram showing the influence of the oil absorption capacity of barium sulfate (Samples 5, 54, and 55 of Table 3).

FIG. 10 shows effects of the oil absorption capacity of barium sulfate in the negative active material. FIG. 10 shows that an oil absorption capacity of barium sulfate in the negative active material of 12 mL/100 g or more further inhibits a permeation short circuit. Since it was not known that barium sulfate in the negative active material relates to a permeation short circuit, it was not foreseeable that changing the oil absorption capacity of barium sulfate in the negative active material would improve the effect of inhibiting a permeation short circuit. An oil absorption capacity of barium sulfate in the negative active material of 12.5 mL/100 g or more especially improves the effect of inhibiting a permeation short circuit.

Figure 11:
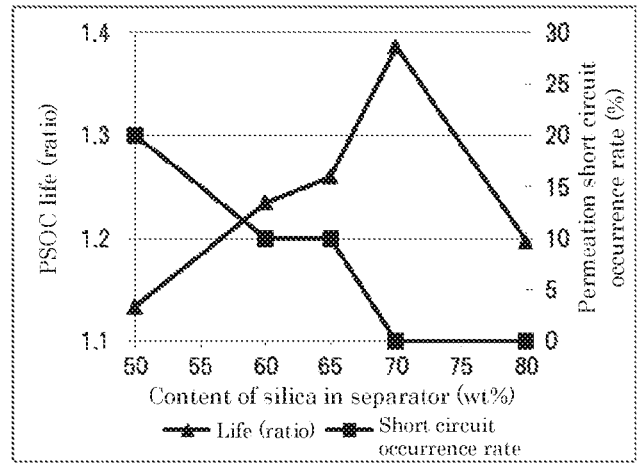
FIG. 11 is a characteristic diagram showing the influence of the content of silica ($SiO_2$) in a synthetic resin separator (Samples 5 and 48 to 51 of Table 3).

The separator containing a synthetic resin, such as polyolefin including polyethylene, contains silica ($SiO_2$) to provide porosity. The same applies to other synthetic resin separators. FIG. 11 shows effects of the content of silica ($SiO_2$) in the separator. FIG. 11 shows that the content of silica ($SiO_2$) in the separator of 60 mass % or more can further inhibit a permeation short circuit. Since it was not known that the content of silica ($SiO_2$) in the separator relates to a permeation short circuit, it was not foreseeable that changing the content of silica ($SiO_2$) in the separator would improve the effect of inhibiting a permeation short circuit. A content of silica ($SiO_2$) in the separator of 70 mass % or more especially improves the effect of inhibiting a permeation short circuit. Meanwhile, a content of silica ($SiO_2$) in the separator of more than 80 mass % reduces the PSOC life (FIG. 11).

Figure 12:
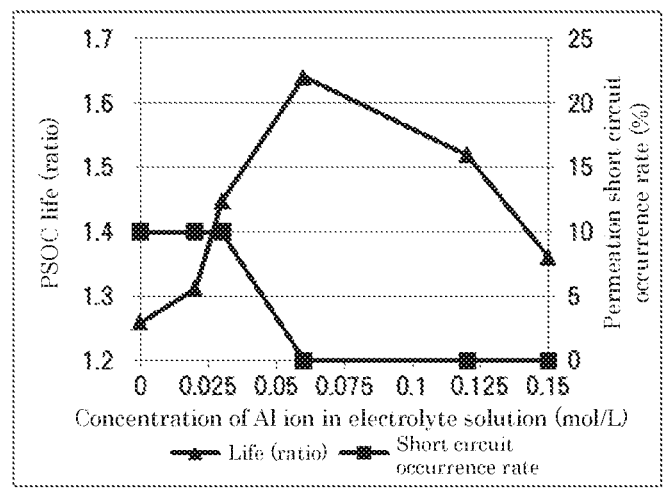
FIG. 12 is a characteristic diagram showing the influence of the content of aluminum ions (Samples 5 and 31 to 35 of Table 3).

FIG. 12 shows effects of aluminum ions in the electrolyte solution. It can be seen that the permeation short circuit can be further inhibited by aluminum ions in the electrolyte solution. The effect of inhibiting a permeation short circuit by aluminum ions is noticeable when the content of the aluminum ions is 0.06 mol/L or more. Comparison between samples 1 and 4 of Table 3 shows that when the negative active material does not contain graphite, the effect of inhibiting a permeation short circuit cannot be obtained even when the electrolyte solution contains aluminum ions. Thus, the effect of aluminum ions of inhibiting a permeation short circuit is obtained only when the negative active material contains graphite.

A concentration of aluminum ions in the electrolyte solution of 0.02 mol/L or more significantly improves the PSOC life performance, and a concentration of aluminum ions in the electrolyte solution of 0.03 mol/L or more markedly improves the PSOC life performance (FIG. 12). In addition, a concentration of aluminum ions in the electrolyte solution of 0.15 mol/L or less significantly improves the PSOC life performance, and a concentration of aluminum ions in the electrolyte solution of 0.12 mol/L or less markedly improves the PSOC life performance (FIG. 12).

Figure 13:
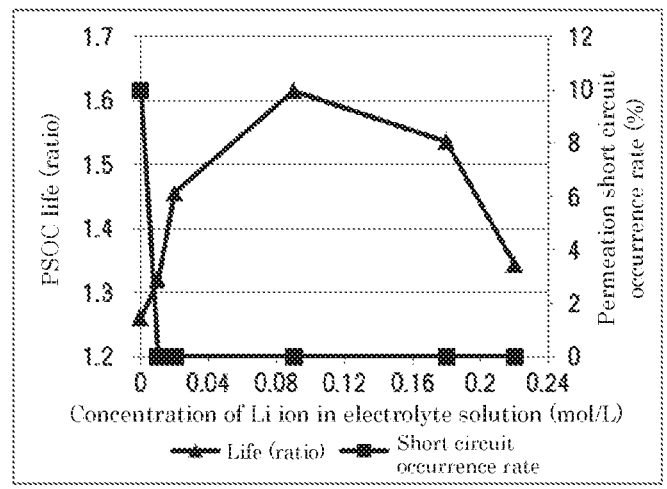
FIG. 13 is a characteristic diagram showing the influence of the content of lithium ions (Samples 5 and 36 to 40 of Table 3).

FIG. 13 shows effects of lithium ions. It can be seen that lithium ions in the electrolyte solution can further inhibit a permeation short circuit. The effect of inhibiting a permeation short circuit by lithium ions is noticeable when the content of lithium ions is 0.01 mol/L or more. Comparison between samples 1 and 4 of Table 3 shows that when the negative active material does not contain graphite, the effect of inhibiting a permeation short circuit cannot be obtained even when the electrolyte solution contains lithium ions. Thus, the effect of lithium ions of inhibiting a permeation short circuit is obtained only when the negative active material contains graphite.

A concentration of lithium ions in the electrolyte solution of 0.01 mol/L or more significantly improves the PSOC life performance, and a concentration of lithium ions in the electrolyte solution of 0.02 mol/L or more markedly improves the PSOC life performance (FIG. 13). In addition, a concentration of lithium ions in the electrolyte solution of 0.22 mol/L or less significantly improves the PSOC life performance, and a concentration of lithium ions in the electrolyte solution of 0.18 mol/L or less markedly improves the PSOC life performance (FIG. 13).

In Example, a lead-acid battery which is excellent in PSOC life and suffers little permeation short circuit is obtained, and a glass mat etc. may be used as a separator to produce a valve-regulated lead-acid battery.

What is claimed is:
1. A lead-acid battery comprising a negative electrode plate, a positive electrode plate, an electrolyte solution, and a separator, wherein
   the negative electrode plate includes a negative electrode material containing either graphite or carbon fiber, and barium sulfate, and
   an average plate interval S between the negative electrode plate and the positive electrode plate, and a mass W of the negative electrode material per one negative electrode plate are in a ratio S/W of 0.01 mm/g or more.
2. The lead-acid battery according to claim 1, wherein the negative electrode material contains 0.6 mass % or more of barium sulfate.

3. The lead-acid battery according to claim 1, wherein the negative electrode material contains 1.2 mass % or more of barium sulfate.

4. The lead-acid battery according to claim 1, wherein the negative electrode material contains carbon black.

5. The lead-acid battery according to claim 1, wherein the negative electrode material contains less than 2.5 mass % of graphite or less than 2.5 mass % of carbon fiber.

6. The lead-acid battery according to claim 1, wherein the ratio S/W is 0.02 mm/g or less.

7. The lead-acid battery according to claim 1, wherein the negative electrode material contains 3.5 mass % or less of barium sulfate.

8. The lead-acid battery according to claim 1, wherein the graphite or carbon fiber has an electric resistivity of 0.01 $\Omega \cdot cm$ or less in powder form as measured by a four-terminal method.

9. The lead-acid battery according to claim 1, wherein the barium sulfate has an oil absorption capacity of 12 mL/100 g or more.

10. The lead-acid battery according to claim 1, wherein the separator has a content of silica ($SiO_2$) of 60 mass % or more.

11. The lead-acid battery according to claim 1, wherein the electrolyte solution contains aluminum ions.

12. The lead-acid battery according to claim 1, wherein the electrolyte solution contains aluminum ions of 0.02 mol/L or more.

13. The lead-acid battery according to claim 1, wherein the electrolyte solution contains lithium ions.

14. The lead-acid battery according to claim 1, wherein the electrolyte solution contains lithium ions of 0.01 mol/L or more.

15. The lead-acid battery according to claim 1, wherein the graphite or carbon fiber is scalelike graphite or expanded graphite.

16. A lead-acid battery comprising a negative electrode plate, a positive electrode plate, an electrolyte solution, and a separator, wherein
the negative electrode plate includes a negative electrode material containing either graphite or carbon fiber, and elemental barium, and
an average plate interval S between the negative electrode plate and the positive electrode plate, and a mass W of the negative electrode material per one negative electrode plate are in a ratio S/W of 0.01 mm/g or more.

* * * * *